United States Patent
Andoh

(10) Patent No.: US 7,793,912 B2
(45) Date of Patent: Sep. 14, 2010

(54) FLUID PRESSURE ACTUATED POPPET VALVE

(75) Inventor: Motoyoshi Andoh, Nagoya (JP)

(73) Assignee: Denso Corporation, Kariya (JP)

( * ) Notice: Subject to any disclaimer, the term of this patent is extended or adjusted under 35 U.S.C. 154(b) by 309 days.

(21) Appl. No.: 11/928,209

(22) Filed: Oct. 30, 2007

(65) Prior Publication Data

US 2008/0105307 A1      May 8, 2008

(30) Foreign Application Priority Data

Nov. 8, 2006    (JP)    ............................. 2006-303257
Apr. 19, 2007   (JP)    ............................. 2007-110427

(51) Int. Cl.
    *F16K 31/12*       (2006.01)
(52) U.S. Cl. .................... 251/30.01; 251/29; 137/625.6
(58) Field of Classification Search ............. 137/87.04, 137/115.19, 115.23, 596.11, 625.6; 251/30.01, 251/30.02, 0.04, 30.05, 25, 26, 28, 29, 30, 251/30.03
    See application file for complete search history.

(56) References Cited

U.S. PATENT DOCUMENTS

| | | | | |
|---|---|---|---|---|
| 1,849,702 A | * | 3/1932 | Bard | ........................... 137/113 |
| 3,224,455 A | * | 12/1965 | Alfieri | ........................ 137/113 |
| 3,664,362 A | * | 5/1972 | Weise | ........................... 137/102 |
| 3,862,738 A | * | 1/1975 | Stumpmeier | .................. 251/43 |
| 4,187,871 A | * | 2/1980 | Hendrickson | ................ 137/112 |
| 4,257,572 A | * | 3/1981 | Neff | ......................... 251/30.02 |
| 4,480,653 A | * | 11/1984 | Vanderburg | .................. 137/112 |
| 4,519,572 A | | 5/1985 | Muller et al. | |
| 4,706,932 A | * | 11/1987 | Yoshida et al. | ................. 251/31 |
| 5,174,544 A | * | 12/1992 | Emanie | .................... 251/30.01 |
| 5,779,217 A | * | 7/1998 | Lucas et al. | .............. 251/30.01 |

FOREIGN PATENT DOCUMENTS

JP           05-071659          3/1993

* cited by examiner

*Primary Examiner*—John K Fristoe, Jr.
*Assistant Examiner*—Marina Tietjen
(74) *Attorney, Agent, or Firm*—Nixon & Vanderhye PC

(57) ABSTRACT

In a valve body, an input chamber is located between a small diameter slide hole, which slidably supports a small diameter portion of a slidable valve, and a large diameter slide hole, which slidably supports a large diameter portion of the slidable valve, at a location that is closer to the small diameter slide hole than to the large diameter slide hole. An output chamber is located between the small diameter slide hole and the large diameter slide hole at a location that is closer to the large diameter slide hole than to the small diameter slide hole. A valve opening communicates between the input chamber and the output chamber and is opened and closed in response to a slide position of the slidable valve. A pilot chamber exerts a pilot pressure to urge the slidable valve in a valve closing direction toward the valve opening.

6 Claims, 4 Drawing Sheets

FLUID PRESSURE ACTUATED POPPET VALVE

CROSS REFERENCE TO RELATED APPLICATION

This application is based on and incorporates herein by reference Japanese Patent Application No. 2006-303257 filed on Nov. 8, 2006 and Japanese Patent Application No. 2007-110427 filed on Apr. 19, 2007.

BACKGROUND OF THE INVENTION

1. Field of the Invention

The present invention relates to a fluid pressure actuated poppet valve, which is opened by a fluid pressure (hereinafter, referred to as an input pressure) supplied from an input port, and which is closed by a fluid pressure (hereinafter, referred to as a pilot pressure) supplied from a pilot port.

2. Description of Related Art

In a case of the fluid pressure actuated poppet valve, in which the valve is driven in a valve opening direction by the input pressure supplied from the input port to an input chamber and is driven in a valve closing direction by the pilot pressure supplied from the pilot port to a pilot chamber the valve cannot be closed unless the valve closing force is made larger than the valve opening force. Thus, a pressure receiving surface area of the valve on an input pressure side needs to be made smaller than a pressure receiving surface area of the valve on a pilot pressure chamber side. This kind of technique is recited in, for example, U.S. Pat. No. 4,519,572.

FIG. 4A schematically shows the technique of U.S. Pat. No. 4,519,572. A portion of a valve J2, which receives an input pressure from an input chamber J1, is formed as a small diameter portion J3. Another portion of the valve J2, which receives a pilot pressure from a pilot chamber J4, is formed as a large diameter portion J5. A pressure receiving surface area of the valve J2 on an input pressure side is made smaller than a pressure receiving surface area of the valve J2 on a pilot chamber J4 side. In this way, the valve closing force can be made larger than the valve opening force.

However, according to the technique of U.S. Pat. No. 4,519,572, a variable volume portion J6, a volume of which changes in response to movement of the valve J2, is formed in a stepped portion (a portion of varying diameter between the small diameter portion J3 and the large diameter portion J5) of the valve J2.

Therefore, an external drain J7, which communicates the variable volume portion J6 to the outside, needs to be provided to enable a change in the volume of the variable volume portion J6.

Here, in a case where oil is employed as working fluid, the oil is introduced into the variable volume portion J6 through a slide clearance between the small diameter portion J3 and a valve body J8 and a slide clearance between the large diameter portion J5 and the valve body J8. It is thus not possible to use the technique disclosed in U.S. Pat. No. 4,519,572 in a system, which cannot permit oil leakage in a radially outward direction from the valve body J8.

As an alternative, with reference to FIG. 4B, although not recited in U.S. Pat. No. 4,519,572, it is conceivable to provide an O-ring J9 between the small diameter portion J3 and the valve body J8 and another O-ring J10 between the large diameter portion J5 and the valve body J8. In this way, flow of the oil into the variable volume portion J6 can be limited.

However, the provision of the O-rings J9, J10 would degrade the slidability of the valve J2 and thus its response. Furthermore, when the pressure receiving surface area of the valve J2 on the small diameter side and the pressure receiving surface area of the valve J2 on the large diameter side are increased to increase the valve opening force and the valve closing force in order to improve the degraded slidability of the valve J2, which is degraded by the addition of the O-rings J9, J10, the size of the valve J2 is disadvantageously increased. Furthermore, the provision of the O-rings J9, J10 would result in an increase in costs.

In the above case, the oil is used as the example of the working fluid. However, even if the working fluid is changed to another type of liquid or gas, the above disadvantage is still encountered.

SUMMARY OF THE INVENTION

The present invention addresses the above disadvantage. Thus, it is an objective of the present invention to provide a fluid pressure actuated poppet valve, in which a variable volume portion that requires an external drain is not formed in a stepped portion (a varying diameter portion) between a small diameter portion and a large diameter portion in the valve.

To achieve the objective of the present invention, there is provided a fluid pressure actuated poppet valve, which includes a slidable valve and a valve body. The slidable valve includes a small diameter portion, which has a first outer diameter, and a large diameter portion, which has a second outer diameter. The second outer diameter of the large diameter portion is larger than the first outer diameter of the small diameter portion. The valve body slidably receives the slidable valve and includes an input port, an output port, a small diameter slide hole, a large diameter slide hole, an input chamber, an output chamber, a valve opening, a pilot chamber and a pilot port. In the valve body, fluid is supplied externally into the input port, and fluid is outputted externally from the output port. The small diameter slide hole slidably supports the small diameter portion therein. The large diameter slide hole slidably supports the large diameter portion therein. The input chamber is communicated with the input port and is located between the small diameter slide hole and the large diameter slide hole at a location that is closer to the small diameter slide hole than to the large diameter slide hole. The output chamber is communicated with the output port and is located between the small diameter slide hole and the large diameter slide hole at a location that is closer to the large diameter slide hole than to the small diameter slide hole. The valve opening communicates between the input chamber and the output chamber. The valve opening is opened and closed or is adjusted for an opening degree thereof in response to a slide position of the slidable valve. The pilot chamber is provided on one axial side of the large diameter portion, which is opposite from the small diameter portion. The pilot port is communicated with the pilot chamber and receives a pilot pressure, which is in turn supplied to the pilot chamber to urge the slidable valve in a valve closing direction toward the valve opening.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1A:
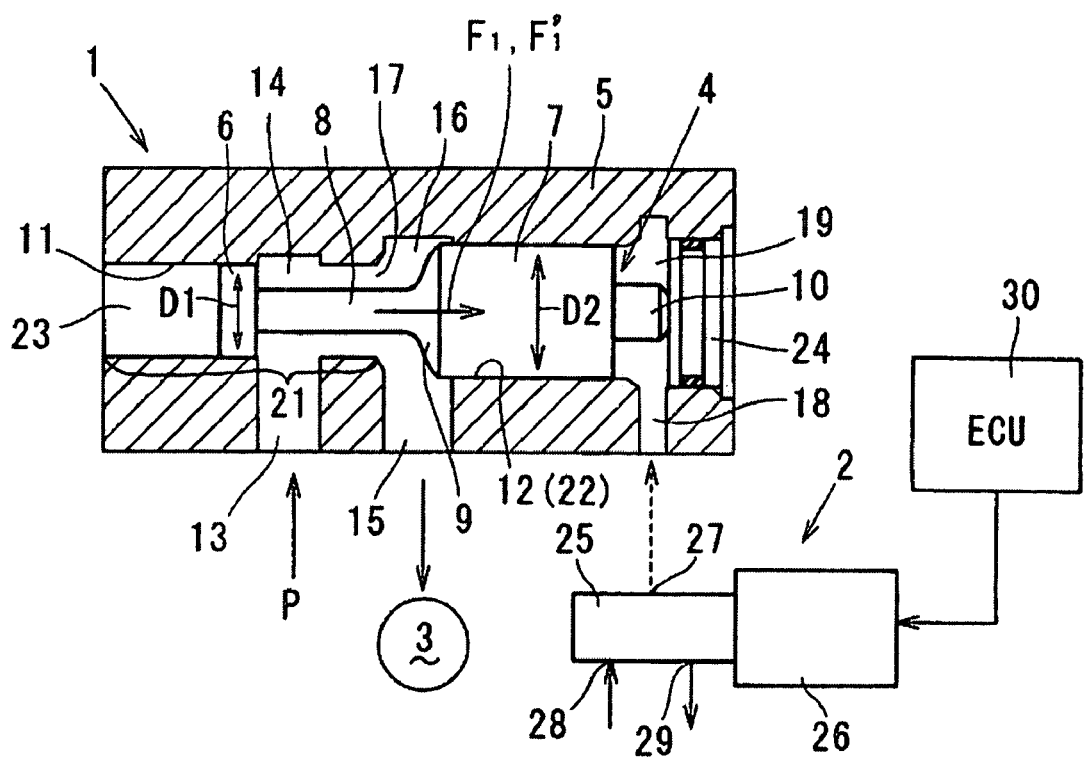
FIG. 1A is a cross sectional view of a hydraulic control valve according to a first embodiment of the present invention in one operational position.
Figure 1B:
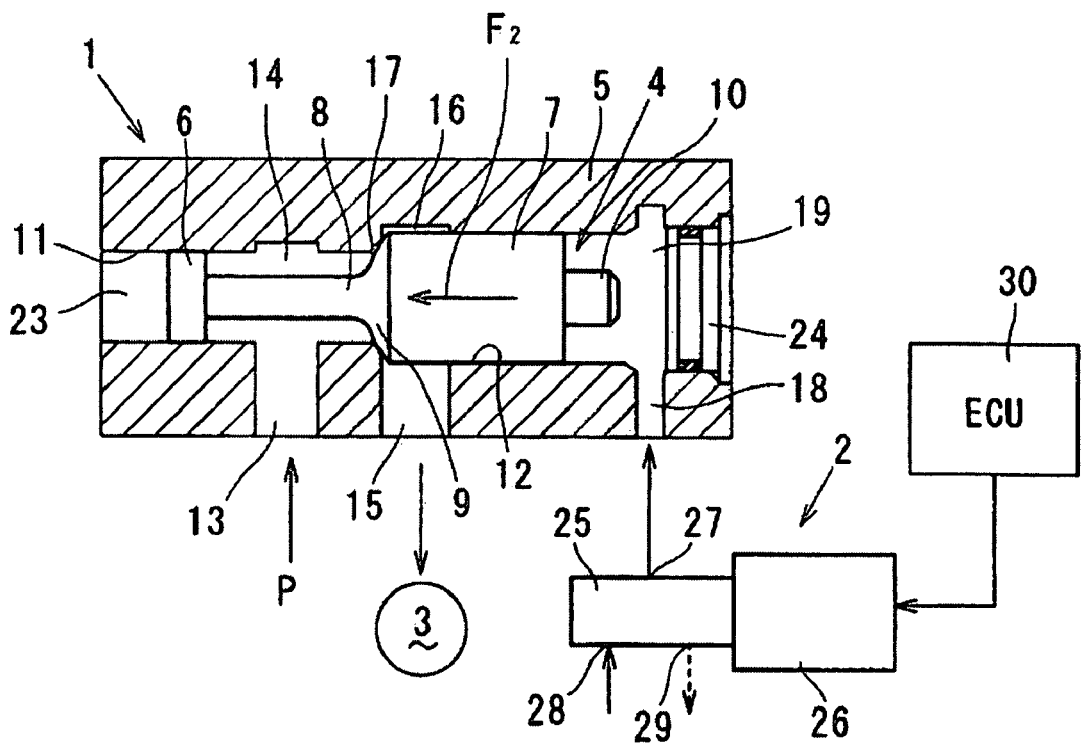
FIG. 1B is a cross sectional view of the hydraulic control valve according to the first embodiment in another operational position.

With reference to FIGS. 1A and 1B, a description will now be made to a first embodiment, in which the present invention is applied to a hydraulic control valve in an automatic transmission.

A hydraulic control valve 1 according to the first embodiment is installed in combination with a pilot valve 2 in a hydraulic control system of the automatic transmission.

The hydraulic control valve 1 is an on-off valve, which can supply a hydraulic pressure (can turn on the hydraulic pressure) to a hydraulically controlled subject 3. More specifically, the hydraulic control valve 1 is one type of a hydraulic poppet valve, in which an input pressure supplied from an input port 13 (or the hydraulic pressure generated by an oil pump) produces a valve opening force, and a control hydraulic pressure supplied from the pilot valve 2 to a pilot port 18 (the pilot pressure) produces a valve closing force.

(Description of Hydraulic Control Valve)

The hydraulic control valve 1 is the poppet valve, in which a seat section 9 of a large diameter portion 7 is seated and lifted relative to a valve opening 17 to close and open the valve opening 17. Specifically, the hydraulic control valve 1 includes a slidable valve 4 and a valve body 5. The valve body 5 slidably receives the valve 4 and can be formed as a portion of a component of a hydraulic circuit or can be formed as a component separated from the component of the hydraulic circuit.

The valve 4 is formed in a generally bar-like shape, which extends in an axial direction. The valve 4 includes a small diameter portion 6, the large diameter portion 7 and a shaft (connector) 8, which are integrally formed together. An outer diameter of the large diameter portion 7 is larger than an outer diameter of the small diameter portion 6. The shaft 8 axially connects, i.e., joins between the small diameter portion 6 and the large diameter portion 7.

The small diameter portion 6 is a cylindrical body, which has an outer diameter D1. The large diameter portion 7 is a cylindrical body, which has an outer diameter D2.

Additionally, the seat section 9, which is seatable against the valve opening 17, is formed in a left end surface of the large diameter portion 7 (in a stepped portion of the shaft 8) in FIGS. 1A and 1B. The seat section 9 is tapered to have a decreasing diameter, which is decreased toward the left side in FIGS. 1A and 1B.

As illustrated in FIG. 1B, a diameter of the effective annular engaging part of the seat section, measured along a radially innermost annular boundary of the engaging part of the seat section that is engaged with the inner peripheral wall surface of the valve opening, so-called diameter D3 (not labeled in FIG. 1B), is larger than diameter D1.

A projection 10 is formed in a right end surface of the large diameter portion 7 in FIGS. 1A and 1B. The projection 10 is formed such that even when the valve 4 is moved toward the right side of FIGS. 1A and 1B (a valve opening side), the hydraulic pressure in a pilot chamber 19 described below in detail can be applied to the end surface of the large diameter portion 7 located on the right side in FIGS. 1A and 1B (on one axial side of the large diameter portion 7 that is opposite from the small diameter portion 6).

A small diameter slide hole 11, a large diameter slide hole 12, an input chamber 14, an output chamber 16, the valve opening 17 and the pilot chamber 19 are formed in the valve body 5. The small diameter slide hole 11 slidably supports the small diameter portion 6. The large diameter slide hole 12 slidably supports the large diameter portion 7. The input chamber 14 is provided between the small diameter slide hole 11 and the large diameter slide hole 12 at a location that is closer to the small diameter slide hole 11 than to the large diameter slide hole 12. Furthermore, the input chamber 14 is communicated with the input port 13, through which a fluid is externally supplied. The output chamber 16 is provided between the small diameter slide hole 11 and the large diameter slide hole 12 at a location that is closer to the large diameter slide hole 12 than to the small diameter slide hole 11. Furthermore, the output chamber 16 is communicated with an output port 15, through which an output pressure is outputted externally. The valve opening 17 communicates between the input chamber 14 and the output chamber 16. Furthermore, the valve opening 17 is opened and closed or is adjusted for an opening degree thereof in response to a slide position of the valve 4. The pilot chamber 19 is provided on the one axial side of the large diameter portion 7, which is opposite from the small diameter portion 6, and is communicated with the pilot port 18, to which a pilot pressure is applied to urge the valve 4 in the valve closing direction thereof toward the valve opening 17.

More specifically, the valve body 5 has a shaft hole that slidably supports the valve 4. The shaft hole has a small diameter shaft hole 21 on the left side in FIGS. 1A and 1B and has a large diameter shaft hole 22 on the right side in FIGS. 1A and 1B. The small diameter shaft hole 21 has a diameter (diameter D1+slide clearance) for slidably supporting the small diameter portion 6. The large diameter shaft hole 22 has a diameter (diameter D2+slide clearance) for slidably supporting the large diameter portion 7.

The left part of the small diameter shaft hole 21 in FIGS. 1A and 1B is used as the small diameter slide hole 11, which slidably supports the small diameter portion 6. The large diameter shaft hole 22 is used as the large diameter slide hole 12, which slidably supports the large diameter portion 7.

A breathing opening 23 is formed in a left side part of the small diameter shaft hole 21 in FIGS. 1A and 1B to communicate with a low pressure side (e.g., an interior of an oil pan).

Additionally, a right end part of the large diameter shaft hole 22 in FIGS. 1A and 1B is closed by a plug 24, which is installed after installation of the valve 4 into the valve body 5, so that leakage of oil from the valve body 5 to the outside is limited.

The input port 13 is a hole, which is formed in the lateral side surface of the small diameter shaft hole 21 to communicate between the external surface of the valve body 5 and the input chamber 14. The input port 13 is communicated with an oil outlet of an undepicted oil pump (a hydraulic pressure generating means) through an oil passage and a switching valve and receives an input pressure as the oil discharged by the oil pump.

The output port 15 is a hole, which is formed in the lateral side surface of the large diameter shaft hole 22 on the right side of the input port 13 in FIGS. 1A and 1B and which communicates between the external surface of the valve body 5 and the output chamber 16. The output port 15 is communicated with the hydraulically controlled subject 3 through an oil passage to apply a hydraulic pressure, which is exerted at the output port 15, to the hydraulically controlled subject 3.

The valve opening 17 is a right end opening of the small diameter shaft hole 21 in FIGS. 1A and 1B. When the seat section 9 of the large diameter portion 7 is seated against the valve opening 17, the communication between the input chamber 14 and the output chamber 16 is interrupted. When the seat section 9 of the large diameter portion 7 is lifted away from the valve opening 17, the input chamber 14 and the output chamber 16 are communicated with each other, so that the fluid flows from the input chamber 14 to the output chamber 16 around an outer peripheral surface of the shaft 8, which is positioned radially inward of an outer peripheral slide surface of the small diameter portion 6 and is radially spaced from the inner peripheral wall of the valve body 5. As noted above, a diameter D3 of an effective engaging part of the seat section 9, which is actually engaged with the valve opening 17, is set to be larger than the diameter D1 of the small diameter portion 6 (the seating diameter D3 is not labeled in FIG. 1B).

The pilot port 18 is a hole, which is formed in the lateral side surface of the large diameter shaft hole 22 and which communicates between the external surface of the valve body 5 and the pilot chamber 19. The pilot port 18 is also communicated with a pilot output port (outlet) 27 of the pilot valve 2 to supply the pilot pressure, which is outputted from the pilot valve 2, to the pilot chamber 19.

(Description of Pilot Valve)

The pilot valve 2 is a well-known three-way solenoid valve (serving as an example of a three-way electric valve), which controls the pilot pressure of the pilot chamber 19 in the hydraulic control valve 1. The pilot valve 2 includes a three-way pilot valve 25, which has a three-way valve structure, and a solenoid actuator 26 (serving as an example of an electric actuator), which drives the three-way pilot valve 25.

The three-way pilot valve 25 has, for example, a poppet valve structure or a ball valve structure. The three-way pilot valve 25 can switch the communication of the pilot output port 27, which is communicated with the pilot port 18 of the hydraulic control valve 1, between a pilot input port 28 and a pressure discharge port 29. The pilot input port 28 receives the input pressure from the oil pump through an oil passage. The pressure discharge port 29 is connected to the low pressure side.

Unlike a pilot valve of a second embodiment described below, the pilot valve 2 according to the first embodiment may be a normally high type, in which the pilot output port 27 provides a high output at the time of deenergizing the pilot valve 2 (in a deenergized state), or may be a normally low type, in which the pilot output port 27 provides a low output at the time of deenergizing the pilot valve 2.

Energization of the solenoid actuator 26 is controlled according to a control signal, which is supplied from an electronic control unit (AT-ECU) 30. The solenoid actuator 26 switches the hydraulic pressure of the pilot chamber 19 in the hydraulic control valve 1 either to the input pressure provided from the oil pump or to the discharge pressure based on the control signal supplied from the electronic control unit 30 to the solenoid actuator 26.

A description will now be made to the operation of the hydraulic control valve 1, which employs the aforementioned structure.

(Valve Opening Operation)

In a state where the seat section 9 is seated against the valve opening 17 while the pressure is drained from the pilot chamber 19, when an input pressure P is supplied to the input port 13, a valve opening force F1', which is expressed by the following equation, is generated due to a pressure difference caused by a difference between the diameter D1 of the small diameter portion 6 and the diameter D3 of the engaging part of the seat section 9. Thus, the valve 4 is moved by the valve opening force F1' toward the right side in FIG. 1A. Specifically, the seat section 9 is lifted from the valve opening 17, so that the input chamber 14 is communicated with the output chamber 16.

$$F1'=\pi/4\times(D3^2-D1^2)\times P$$

When the input chamber 14 is communicated with the output chamber 16 upon the lifting of the seat section 9 from the valve opening 17, a valve opening force F1, which is expressed by the following equation, is exerted to the valve 4 due to a difference between the diameter D1 of the small diameter portion 6 and the diameter D2 of the large diameter portion 7. Thus, the valve 4 is further moved toward the right side in FIG. 1A, so that a degree of the communication between the input chamber 14 and the output chamber 16 is increased, and the input pressure P, which is supplied to the input port 13, is exerted at the output port 15. Specifically, the hydraulic control valve 1 is placed in a hydraulic pressure ON state (see FIG. 1A).

$$F1=\pi/4\times(D2^2-D1^2)\times P$$

(Valve Closing Operation)

As described above, when the pilot pressure (input pressure P) is supplied to the pilot chamber 19 upon the operation of the pilot valve 2 in the hydraulic pressure ON state of the hydraulic control valve 1, a valve closing force F2, which is expressed by the following equation, is exerted at the right end of the valve 4 due to the hydraulic pressure exerted in the pilot chamber 19.

$$F2=\pi/4\times D2^2\times P$$

Here, the valve closing force F2 is larger than the valve opening force F1 (i.e., F1<F2), so that the valve 4 is moved toward the left side in FIG. 1B (the valve closing direction), so that the seat section 9 is seated against the valve opening 17, and the supply of the hydraulic pressure from the input port 13 to the output port 15 is stopped (see FIG. 1B).

In a case where the hydraulically controlled subject 3 forms a closed space therein, the hydraulically controlled subject 3 is kept in the hydraulic pressure ON state even when the seat section 9 is seated against the valve opening 17. Furthermore, in a case where the hydraulically controlled subject 3 forms an open space therein (e.g., the hydraulically controlled subject 3 having an external drain or a leaking means), the hydraulic pressure of the hydraulically controlled subject 3 is decreased when the seat section 9 is seated against the valve opening 17.

Advantage of First Embodiment

As discussed above, in the hydraulic control valve 1 of the first embodiment, the small diameter slide hole 11, which supports the small diameter portion 6 of the valve 4, is axially spaced from the large diameter slide hole 12, which supports the large diameter portion 7 of the valve 4, and the input chamber 14, the valve opening 17 and the output chamber 16 are formed between the small diameter slide hole 11 and the large diameter slide hole 12. Therefore, the stepped portion between the small diameter portion 6 and the large diameter portion 7 is located inside the input chamber 14, the valve opening 17 and the output chamber 16, so that no variable volume portion, which would otherwise require an external drain, is formed at the stepped portion between the small diameter portion 6 and the large diameter portion 7. That is, there is no, need to provide an external breathing drain, which extends radially from the stepped portion between the small diameter portion 6 and the large diameter portion 7. Furthermore, it is not necessary to employ a sealing member, such as an O-ring, which limits oil leakage through such an external drain.

Accordingly, without having to use a sealing member, such as an O-ring, the hydraulic control valve 1 can be incorporated into a system that conventionally could not employ such a valve because of external leakage.

Furthermore, since the input pressure P, which is supplied to the input chamber 14, produces the valve opening forces F1 and F1', it is possible to eliminate a return spring, which would be otherwise required to obtain a valve opening force that acts against the pilot pressure.

Second Embodiment

Figure 2A:
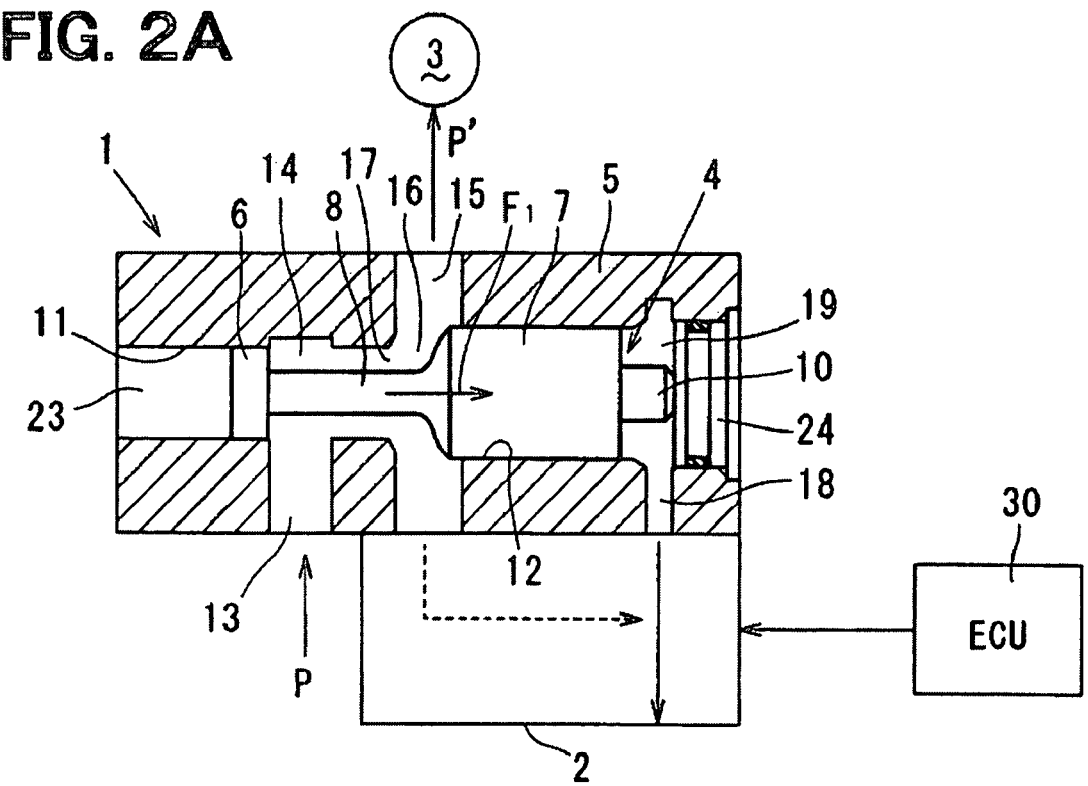
FIG. 2A is a cross sectional view of a hydraulic control valve according to a second embodiment of the present invention in one operational position.
Figure 2B:
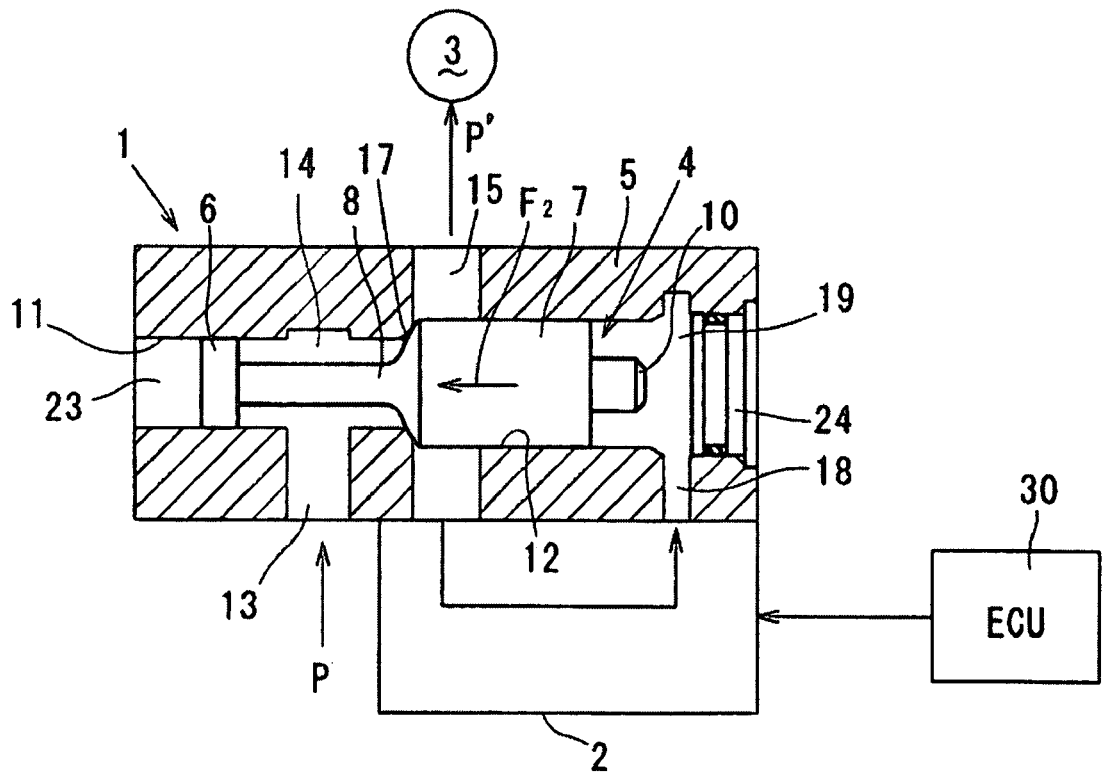
FIG. 2B is a cross sectional view of the hydraulic control valve according to the second embodiment in another operational position.

A second embodiment of the present invention will be described with reference to FIGS. 2A and 2B. In the second embodiment as well as the third embodiment, components, which are similar to those of the first embodiment, are indicated by the same reference numerals.

In the first embodiment, the input pressure P, which is supplied to the pilot input port 28 of the pilot valve 2, is in a parallel relationship to the pressure provided to the input port 13 of the hydraulic control valve 1. Accordingly, in a case where the oil pump is stopped due to, for example, stopping of the engine (e.g., in a case where the oil pump is stopped due to stopping of the engine in an idle start vehicle or a hybrid vehicle), the input pressure P of the pilot valve 2 is decreased, so that the valve closed state of the hydraulic control valve 1 cannot be maintained.

Thus, the second embodiment employs the following means to avoid the aforementioned disadvantage.

In the pilot valve 2 of the second embodiment, an output pressure P', which is exerted in the output chamber 16 of the hydraulic control valve 1, is supplied to the pilot input port 28.

Specifically, in the present embodiment, the hydraulic control valve 1 and the pilot valve 2 are integrated together (for example, by sharing the valve body 5). The pilot valve 2 is operated to communicate the pilot chamber 19 with the output chamber 16 in one operational state or is operated to communicate the pilot chamber 19 with the low pressure side in another operational state.

In this arrangement, first, the input pressure P, which is supplied to the input port 13, opens the valve opening 17 to exert the output pressure P' in the output chamber 16. Then, the pilot valve 2 is operated to supply the pilot pressure (the output pressure P') to the pilot chamber 19. Thus, the valve opening 17 is closed. This makes it possible to maintain the output pressure P of the output port 15 in the case where the input pressure P of the input port 13 is lost (even in the case where the oil pump is stopped) as long as the hydraulically controlled subject 3 is constructed to stop the draining of the pressure. That is, this implements a no-leak valve (a zero-leakage valve), which can maintain the hydraulic pressure ON state of the hydraulically controlled subject 3.

Furthermore, the pilot valve 2 of the second embodiment is of a normally high type that supplies the output pressure P', which is received from the output chamber 16, to the pilot chamber 19 in a state where the supply of electric power from the electronic control unit 30 to the pilot valve 2 is stopped (deenergized state).

Accordingly, in the state where the output pressure P' is exerted from the output port 15 (the hydraulic pressure ON state), when the supply of the electric power to the pilot valve 2 is stopped, the valve opening 17 is closed, and the output pressure P' at the output port 15 is maintained. As a result, even in the case where the input pressure P of the input port 13 is lost (the case where the oil pump is stopped), the hydraulic pressure ON state of the hydraulically controlled subject 3 can be maintained. This makes it possible to reduce the power consumption in the state where the oil pump is stopped.

Subsequently, when the input pressure P is supplied to the input port 13 once again (when the oil pump restarts its operation), the electric power is supplied to the pilot valve 2 to drain the pressure from the pilot chamber 19. Thus, the valve opening 17 is opened, so that the input pressure P, which is supplied to the input port 13, can be outputted from the output port 15 as the output pressure P'.

Modification of Second Embodiment

In the second embodiment, the pilot valve 2 is of the normally high type. Alternatively, the pilot valve 2 may be of a normally low type. In the case where the pilot valve 2 of the normally low type is employed, the pressure of the pilot chamber 19 is drained in the state where the supply of electric power from the electronic control unit 30 to the pilot valve 2 is stopped. In contrast, in the other state where the electric power is supplied from the electronic control unit 30 to the pilot valve 2, the output pressure P', which is received from the output chamber 16, is supplied to the pilot chamber 19.

Accordingly, in the state where the output pressure P' is exerted from the output port 15 (the hydraulic pressure ON state), when the electric power is supplied to the pilot valve 2, the valve opening 17 is closed, and the output pressure P' at the output port 15 is maintained. As a result, even in the case where the input pressure P of the input port 13 is lost (the case where the oil pump is stopped), the hydraulic pressure ON state of the hydraulically controlled subject 3 can be maintained.

Subsequently, when the input pressure P is supplied to the input port 13 once again (when the oil pump restarts its operation), the supply of electric power to the pilot valve 2 is stopped to drain the pressure from the pilot chamber 19. Thus, the valve opening 17 is opened, so that the input pressure P, which is supplied to the input port 13, can be outputted from the output port 15 as the output pressure P'.

Third Embodiment

A third embodiment of the present invention will be described with reference to FIGS. 3A and 3B.

In the second embodiment, the draining of the pressure from the pilot chamber 19 is stopped by the operation of the pilot valve 2 (by turning off of the pilot valve 2 in the case of the normally high type pilot valve 2 and by turning on of the pilot valve 2 in the case of the normally low type pilot valve 2), and part of the output pressure P' is conducted into the pilot chamber 19 to increase the pilot pressure while the valve opening 17 is closed to implement the no-leak valve. At that time, the part of the output pressure P' is consumed to increase the volume of the pilot chamber 19. Thus, when the valve opening 17 is closed, the output pressure P' of the output chamber 16 and the pilot pressure may possibly be slightly reduced in comparison to the input pressure P of the input chamber 14.

When the output pressure P' is lowered below the input pressure P at the time of operating the oil pump in the closed state of the valve opening 17, the valve closing force F2, which acts on the valve 4, is reduced in the state where the no-leak valve is implemented.

In this context, to avoid the aforementioned problems, the hydraulic control valve 1 of the third embodiment employs a bypass passage 31 and a check valve 32. The bypass passage 31 conducts the input pressure P, which is supplied to the input chamber 14, into the output chamber 16 or the pilot chamber 19. The check valve 32 opens the bypass passage 31 when the input pressure P, which is supplied to the input chamber 14, becomes higher than the output pressure P' of the output chamber 16 or of the pilot chamber 19.

The bypass passage 31 and the check valve 32 of the third embodiment are provided in the large diameter portion 7 of the valve 4.

The bypass passage 31 is an oil passage, which communicates between an interior side surface of the seat section 9 of the valve 4 and a pilot chamber 19 side end surface of the valve 4. Even in the closed state of the valve opening 17 where the seat section 9 is seated against the valve opening 17, the bypass passage 31 communicates between the input chamber 14 and the pilot chamber 19.

The bypass passage 31 has a throttling means, which includes a valve opening 34 of the check valve 32 and an oil passage. In the draining state of the pressure from the pilot chamber 19 through the pilot valve 2, a quantity of inflow oil, which flows into the pilot chamber 19 through the bypass passage 31, is set to be smaller than a quantity of outflow oil, which is drained from the pilot chamber 19 through the pilot valve 2.

Figure 3A:
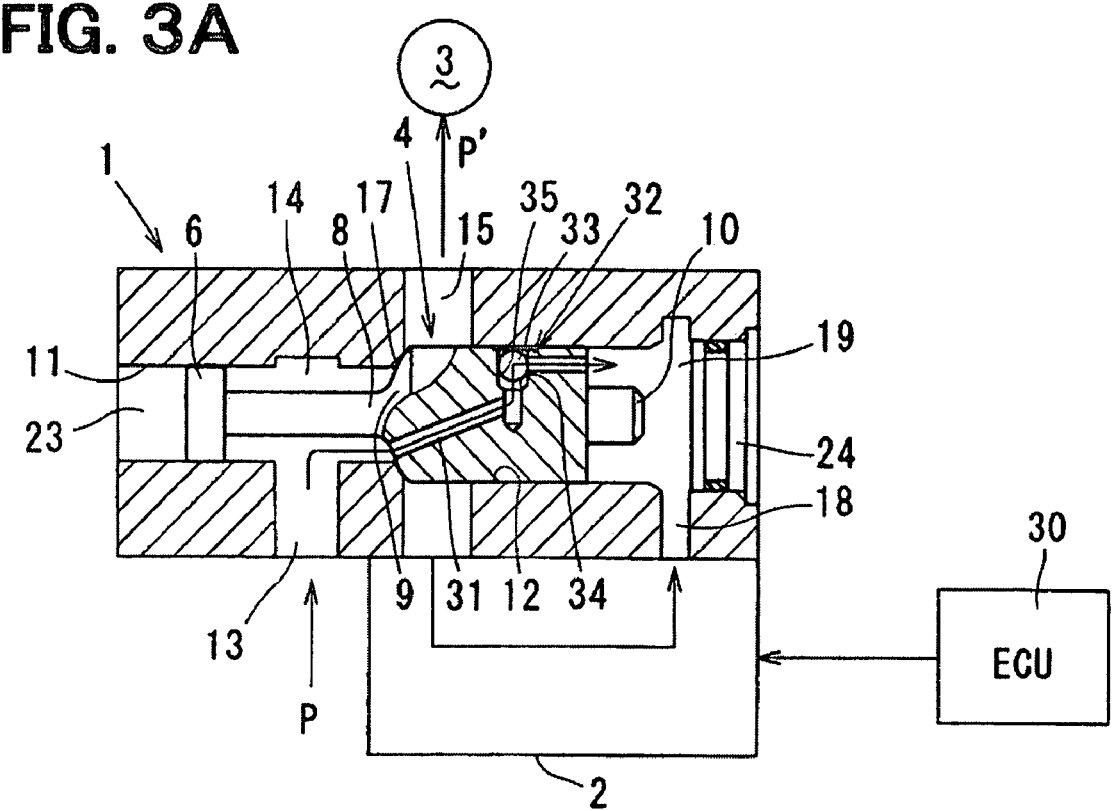
FIG. 3A is a cross sectional view of a hydraulic control valve according to a third embodiment of the present invention, showing a check valve in one operational position.

As shown in FIG. 3A, the check valve 32 is constructed as one way valve. Specifically, when the input pressure P becomes larger than the pilot pressure (output pressure P') (i.e., P>P'), the check valve 32 opens the bypass passage 31 due to the pressure difference between the input pressure P and the pilot pressure (output pressure P'). In contrast, when the pilot pressure (the output pressure P') becomes larger than the input pressure P (i.e., P<P'), the check valve 32 closes the bypass passage 31 due to the pressure difference between the pilot pressure (output pressure P') and the input pressure P. The check valve 32 includes a ball 33 (as one example of a valve element) and the valve opening 34. The ball 33 is displaced by the difference in the hydraulic pressure, and the valve opening 34 is opened and closed by the ball 33.

The valve opening 34 of the check valve 32 is provided in the middle of the bypass passage 31 and forms a decreasing diameter portion, a diameter of which decreases toward the supply side of the input pressure P. When the ball 33 is seated against the valve opening 34, which forms the decreasing diameter portion, the bypass passage 31 is closed.

The inner circumferential surface of the large diameter slide hole 12, i.e., the slide surface, which slidably contacts and supports the large diameter portion 7, prevents the ball 33 from being dislodged, i.e., being removed from the bypass passage 31. More specifically, the ball 33 is radially movably received in a ball receiving hole 35, which extends radially inwardly from the outer peripheral surface of the large diameter portion 7. In a slidable range of the large diameter portion 7, an outer opening of the ball receiving hole 35 is always closed by the inner peripheral surface of the large diameter slide hole 12. In this way, leakage of the oil in the bypass passage 31 through the ball receiving hole 35 is limited, and the dislodging of the ball 33 is limited.

Advantage of Third Embodiment

Due the provision of the bypass passage 31 and the check valve 32 in the hydraulic control valve 1 of the third embodiment, the pilot pressure (output pressure P') is kept equal to or higher than the input pressure P, which is supplied to the input chamber 14, in the state where the pressure is not drained from the pilot chamber 19 through the pilot valve 2.

Thus, in the state where the pilot valve 2 stops the draining of the pressure from the pilot chamber 19 and closes the valve opening 17 during the operation of the oil pump, even when the output pressure P' and the pilot pressure become smaller than the input pressure P (P>P') due to, for example, the consumption of the part of the output pressure P' of the output chamber 16, the check valve 32 can be advantageously opened, as shown in FIG. 3A, so that the input pressure P of the input chamber 14 is supplied to the pilot chamber 19 through the bypass passage 31, and thereby the output pressure P' and the pilot pressure are increased to the input pressure P.

Figure 3B:
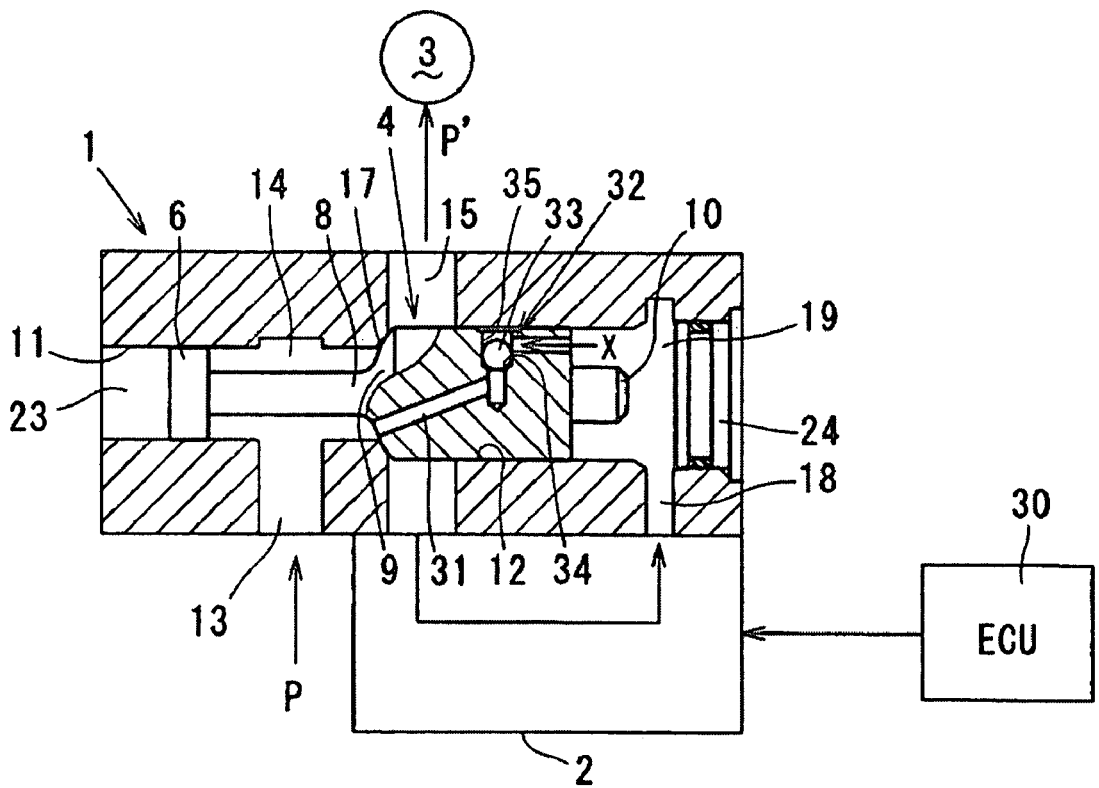
FIG. 3B is a cross sectional view of the hydraulic control valve according to the third embodiment, showing the check valve in another operational position.
Figure 4A:
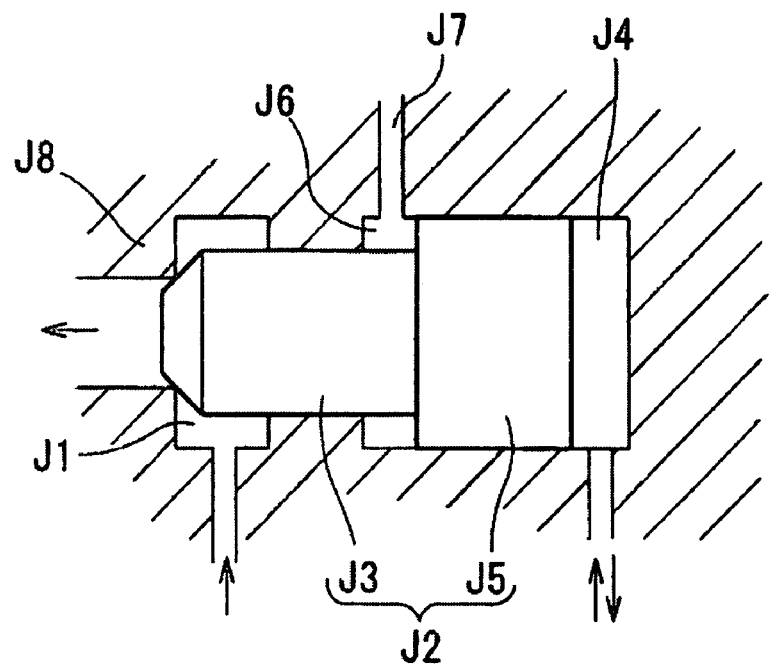
FIG. 4A is a cross sectional views of a hydraulic control valve according to a prior art.
Figure 4B:
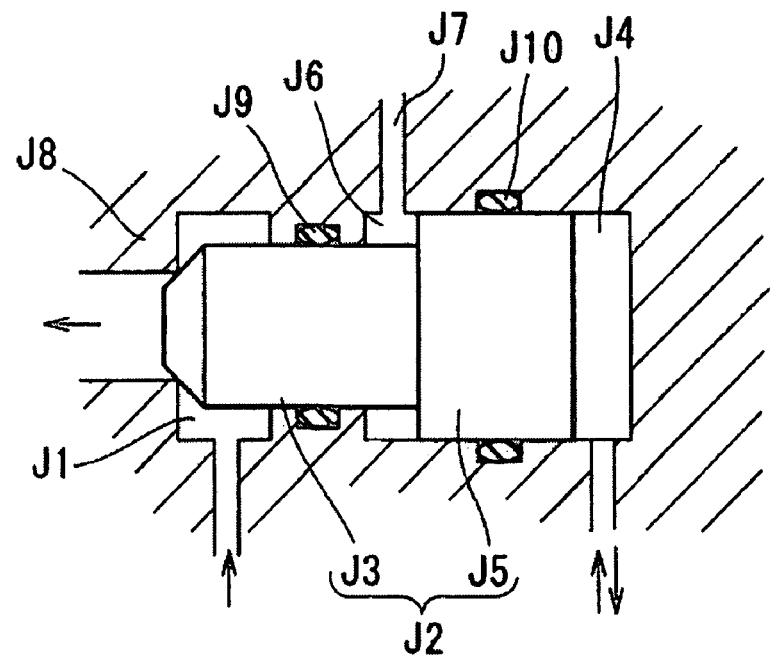
FIG. 4B is a possible modification of the hydraulic control valve shown in FIG. 4A.

In contrast, in the case where the input pressure P is reduced from the output pressure P' and the pilot pressure (i.e., P<P') at the time of, for example, stopping the oil pump, the check valve 32 is closed, as shown in FIG. 3B, and thereby the output pressure P' and the pilot pressure are maintained at the input pressure P.

In this way, it is possible to effectively limit the decrease of the output pressure P' and the decrease of the valve closing force F2 applied to the valve 4 at the time of implementing the no-leak valve.

Furthermore, in the third embodiment, the ball 33, which forms the check valve 32, is limited from the dislodging by the inner peripheral surface (slide surface) of the large diameter slide hole 12. Therefore, it is not required to provide a dedicated component, which limits the dislodging of the ball 33. As a result, it is possible to limit or minimize the costs.

Modification of Third Embodiment

According to the third embodiment, the bypass passage 31 is provided in the valve 4. However, the bypass passage 31 can be made into any other type of bypass passage as long as the bypass passage communicates between the input chamber 14 (or a portion communicated with the input chamber 14) and the output chamber 16 (or a portion communicated with the output chamber 16) or the pilot chamber 19 (or a portion communicated with the pilot chamber 19). In some cases, the bypass passage 31 may be provided in any other part (e.g., in the valve body 5), which is other than the valve 4.

In the third embodiment, the check valve 32 is provided in the middle of the bypass passage 31. Alternatively, the check valve 32 may be provided at the end of the bypass passage 31.

In the third embodiment, the ball 33 is used in the check valve 32. However, any other type of valve element (e.g., a reed) may be used in place of the ball 33 as long as the valve element can be driven by a small pressure difference to open and close the bypass passage 31.

(Modification)

In the above embodiments, the solenoid actuator 26 is used as the actuator of the pilot valve 2. However, any other suitable electric actuator, such as a piezoelectric actuator, may be used in place of the solenoid actuator 26.

In the above embodiments, the present invention is applied to the hydraulic control valve 1, which changes between the ON state and the OFF state of the hydraulic pressure. Alternatively, the present invention may be implemented in any other suitable hydraulic control valve, which controls a hydraulic pressure or an oil quantity in a stepwise fashion or in a linear fashion.

In the above embodiments, the valve opening force is exerted to the valve 4 only by the input pressure P. Additionally, a supplemental return spring, which assists the valve opening force, may be provided.

In the above embodiments, the present invention is applied to the hydraulic control valve 1 of the automatic transmission. Alternatively, the present invention may be applied to a hydraulic control valve used in any other apparatus other than the automatic transmission.

In the above embodiments, the oil is used as the working fluid. Alternatively, any other suitable fluid (e.g., gas or liquid other than oil) may be used as the working fluid.

Additional advantages and modifications will readily occur to those skilled in the art. The invention in its broader terms is therefore not limited to the specific details, representative apparatus, and illustrative examples shown and described.

What is claimed is:

1. A fluid pressure actuated poppet valve comprising:
    a slidable valve that includes a small diameter portion, which has a first outer diameter, and a large diameter portion, which has a second outer diameter, wherein the second outer diameter of the large diameter portion is larger than the first outer diameter of the small diameter portion; and
    a valve body that slidably receives the slidable valve and includes:
        an input port, into which fluid is supplied externally;
        an output port, from which fluid is outputted externally;
        a small diameter slide hole that slidably supports the small diameter portion therein;
        a large diameter slide hole that slidably supports the large diameter portion therein;
        an input chamber that is communicated with the input port and is located between the small diameter slide hole and the large diameter slide hole at a location that is closer to the small diameter slide hole than to the large diameter slide hole;
        an output chamber that is communicated with the output port and is located between the small diameter slide hole and the large diameter slide hole at a location that is closer to the large diameter slide hole than to the small diameter slide hole;
        a valve opening that communicates between the input chamber and the output chamber, wherein the valve opening is opened and closed or an opening degree thereof is adjusted in response to a slide position of the slidable valve;
        a pilot chamber that is provided on one axial side of the large diameter portion, which is opposite from the small diameter portion; and
        a pilot port that is communicated with the pilot chamber and receives a pilot pressure, which is in turn supplied to the pilot chamber to urge the slidable valve in a valve closing direction toward the valve opening,
    wherein:
        when the slidable valve is urged in the valve closing direction toward the valve opening, an inner peripheral wall surface of the valve opening is engageable with an annular engaging part of a seat section provided on an axial end part of the large diameter portion on an opposite axial side of the large diameter portion from the pilot chamber;
        a diameter of the annular engaging part of the seat section, which is measured along a radially innermost annular boundary of the engaging part of the seat section that is engageable with the inner peripheral wall surface of the valve opening, is larger than the first outer diameter;
        when the annular engaging part of the seat section is engaged with the inner peripheral wall surface of the valve opening, a radially inner area of the axial end part of the large diameter portion, which borders on and is located radially inward of the radially innermost annular boundary of the engaging part of the seat section, is entirely exposed to the input chamber and is axially opposed to an axial end part of the small diameter portion, which is exposed to the input chamber;
        a bypass passage that guides an input pressure, which is supplied to the input chamber, to one of the output chamber and the pilot chamber; and
        a check valve that opens the bypass passage when the input pressure, which is supplied to the input chamber, is increased beyond a pressure in one of the output chamber and the pilot chamber.

2. The fluid pressure actuated poppet valve according to claim 1, wherein the pilot port is communicated with an outlet of a three-way electric valve that controls the pilot pressure in response to a state of electric power supply to the three-way electric valve.

3. The fluid pressure actuated poppet valve according to claim 2, wherein the three-way electric valve adjusts a pressure of fluid, which is supplied from the output chamber, and supplies the adjusted fluid to the pilot port.

4. The fluid pressure actuated poppet valve according to claim 3, wherein the three-way electric valve is of a normally high type, which drains a pressure from the pilot chamber to a low pressure side in an energized state thereof and which supplies the fluid received from the output chamber to the pilot chamber in a deenergized state thereof.

5. The fluid pressure actuated poppet valve according to claim 1, wherein:
    the bypass passage and the check valve are provided in the slidable valve;
    the check valve includes a valve element, which opens and closes the bypass passage in response to a difference between the input pressure and the pressure in the one of the output chamber and the pilot chamber; and
    a slide surface of the valve body, which slidably contacts the slidable valve, limits removal of the valve element from the bypass passage.

6. The fluid pressure actuated poppet valve according to claim 1, wherein the small diameter portion and the large diameter portion are joined together by a connector that has an outer peripheral surface, which is positioned radially inward of an outer peripheral slide surface of the small diameter portion and is radially spaced from an inner peripheral wall of the valve body to permit flow of fluid therearound from the input chamber to the output chamber when the valve opening is opened.

* * * * *